United States Patent
Dayama et al.

(10) Patent No.: US 10,614,509 B2
(45) Date of Patent: Apr. 7, 2020

(54) COLLABORATIVE AND COGNITIVE MULTI-OUTLET FOOD ORDER PLACEMENT AND RECOMMENDATION

(71) Applicant: International Business Machines Corporation, Armonk, NY (US)

(72) Inventors: Pankaj Dayama, Bangalore (IN); Vijay Ekambaram, Bangalore (IN); Santosh Rk Penubothula, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 15/262,301

(22) Filed: Sep. 12, 2016

(65) Prior Publication Data

US 2018/0075551 A1    Mar. 15, 2018

(51) Int. Cl.
*G06Q 30/06* (2012.01)
*G06Q 50/12* (2012.01)

(52) U.S. Cl.
CPC ..... *G06Q 30/0635* (2013.01); *G06Q 30/0613* (2013.01); *G06Q 30/0631* (2013.01); *G06Q 50/12* (2013.01)

(58) Field of Classification Search
CPC ........... G06Q 30/0635; G06Q 30/0631; G06Q 30/0613; G06Q 50/12
USPC ................................. 705/26.81, 26.41, 26.7
See application file for complete search history.

(56) References Cited

U.S. PATENT DOCUMENTS

| | | | |
|---|---|---|---|
| 4,797,818 A | 1/1989 | Cotter | |
| 6,976,004 B2 * | 12/2005 | Wittrup | G06Q 10/06 425/523 |
| 2006/0218039 A1 | 9/2006 | Johnson | |
| 2007/0040026 A1 | 2/2007 | Vleet et al. | |

(Continued)

FOREIGN PATENT DOCUMENTS

IN        2016-643605    * 6/2016  ......... G06Q 30/0635

OTHER PUBLICATIONS

Article, Patents; agency reviews patent application approval request for "electronic select provider network", Sep. 19, 2013, published in Politics & Government Week Retrieved from Dialog Solutions on Nov. 19, 2019.*

(Continued)

*Primary Examiner* — Yogesh C Garg
(74) *Attorney, Agent, or Firm* — Ryan, Mason & Lewis, LLP

(57) ABSTRACT

Methods, systems, and computer program products for collaborative and cognitive multi-outlet food order placement and recommendation are provided herein. A computer-implemented method includes calculating a minimum waiting time required for delivery of a group of items from a multi-outlet food order to one or more users at approximately the same time, wherein the multi-outlet food order was submitted by the users via one or more user devices, and wherein the group of items belong to a shared food order category; deriving food order parameters based on (i) past order patterns attributed to the users, and (ii) existing commitments of outlets included in the multi-outlet food order; generating a recommendation for modifying the multi-outlet food order based on (i) the calculated minimum waiting time and (ii) the food order parameters; and outputting the recommendation to the one or more user devices.

20 Claims, 5 Drawing Sheets

(56) References Cited

U.S. PATENT DOCUMENTS

| | | | |
|---|---|---|---|
| 2009/0228340 A1* | 9/2009 | Bohannon | G06Q 10/107 |
| | | | 705/14.53 |
| 2011/0093363 A1 | 4/2011 | Blatstein | |
| 2012/0036028 A1 | 2/2012 | Webb | |
| 2013/0110650 A1 | 5/2013 | Sutcliffe | |
| 2013/0151357 A1 | 6/2013 | Havas et al. | |
| 2013/0317921 A1* | 11/2013 | Havas | G06O 30/0633 |
| | | | 705/15 |
| 2014/0214465 A1* | 7/2014 | L'Heureux | G06Q 50/12 |
| | | | 705/7.13 |
| 2015/0371316 A1* | 12/2015 | Estelle | G06Q 30/0635 |
| | | | 705/26.81 |
| 2016/0171591 A1* | 6/2016 | Williams | G06Q 30/0635 |
| | | | 705/26.81 |
| 2016/0244311 A1* | 8/2016 | Burks | B67D 1/0888 |
| 2018/0240181 A1* | 8/2018 | Lopez | G06Q 30/0635 |

OTHER PUBLICATIONS

SmartQ, https://www.thesmartq.com/, Mar. 30, 2016.
GrubHub, https://www.grubhub.com, Sep. 11, 2016.
The Meal Mobile, https://www.themealmobile.com, Mar. 23, 2016.
DigitalTimes, Uber Launches UberEATS Food Delivery app, http://www.idigitaltimes.com/uber-launches-ubereats-food-delivery-app-download-it-now-468991, Aug. 23, 2015.
Wikipedia, Open Table, https://en.wikipedia.org/wiki/OpenTable, Aug. 3, 2016.

\* cited by examiner

COLLABORATIVE AND COGNITIVE MULTI-OUTLET FOOD ORDER PLACEMENT AND RECOMMENDATION

FIELD

The present application generally relates to information technology, and, more particularly, to automated food ordering techniques.

BACKGROUND

When individuals visit venues such as food courts, or order food from multiple venues, such individuals often feel a need for coordinated delivery of food items such that the food items can be consumed hot and/or fresh. However, existing food coordination approaches fail to organize delivery of multiple orders from separate venues.

SUMMARY

In one embodiment of the present invention, techniques for collaborative and cognitive multi-outlet food order placement and recommendation are provided. An exemplary computer-implemented method can include calculating a minimum waiting time required for delivery of a group of items from a multi-outlet food order to one or more users at approximately the same time, wherein the multi-outlet food order was submitted by the one or more users via one or more user devices, and wherein the group of items belong to a shared food order category. Such a method can also include deriving one or more food order parameters based on (i) one or more past order patterns attributed to the one or more users, and (ii) one or more existing commitments of one or more outlets included in the multi-outlet food order. Further, such a method can include generating a recommendation for modifying the multi-outlet food order based on (i) the calculated minimum waiting time and (ii) the one or more food order parameters, and outputting the recommendation to the one or more user devices.

In another embodiment of the invention, an exemplary computer-implemented method can include presenting, to a group of users via one or more user devices, a graph comprising nodes corresponding to (i) food items, (ii) drink items, and (iii) outlets, and processing a multi-outlet order entered via the one or more user devices, wherein the multi-outlet order comprises selected nodes and edges within the graph. Such a method can also include calculating a minimum waiting time required for delivery of all items in the multi-outlet order to the group of users at approximately the same time, wherein calculating comprises calculating inter-node delay values for the selected edges connecting the selected nodes. Further, such a method includes deriving one or more order parameters based on (i) one or more past order patterns attributed to the users in the group, and (ii) one or more existing commitments of one or more outlets included in the multi-outlet order. Additionally, such a method can include generating a recommendation for modifying the multi-outlet order based on (i) the calculated minimum waiting time and (ii) the one or more order parameters, and outputting the recommendation to the one or more user devices, wherein the output recommendation comprises replacement of one or more of the selected nodes and one or more of the selected edges with one or more different nodes and one or more different edges in the graph.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
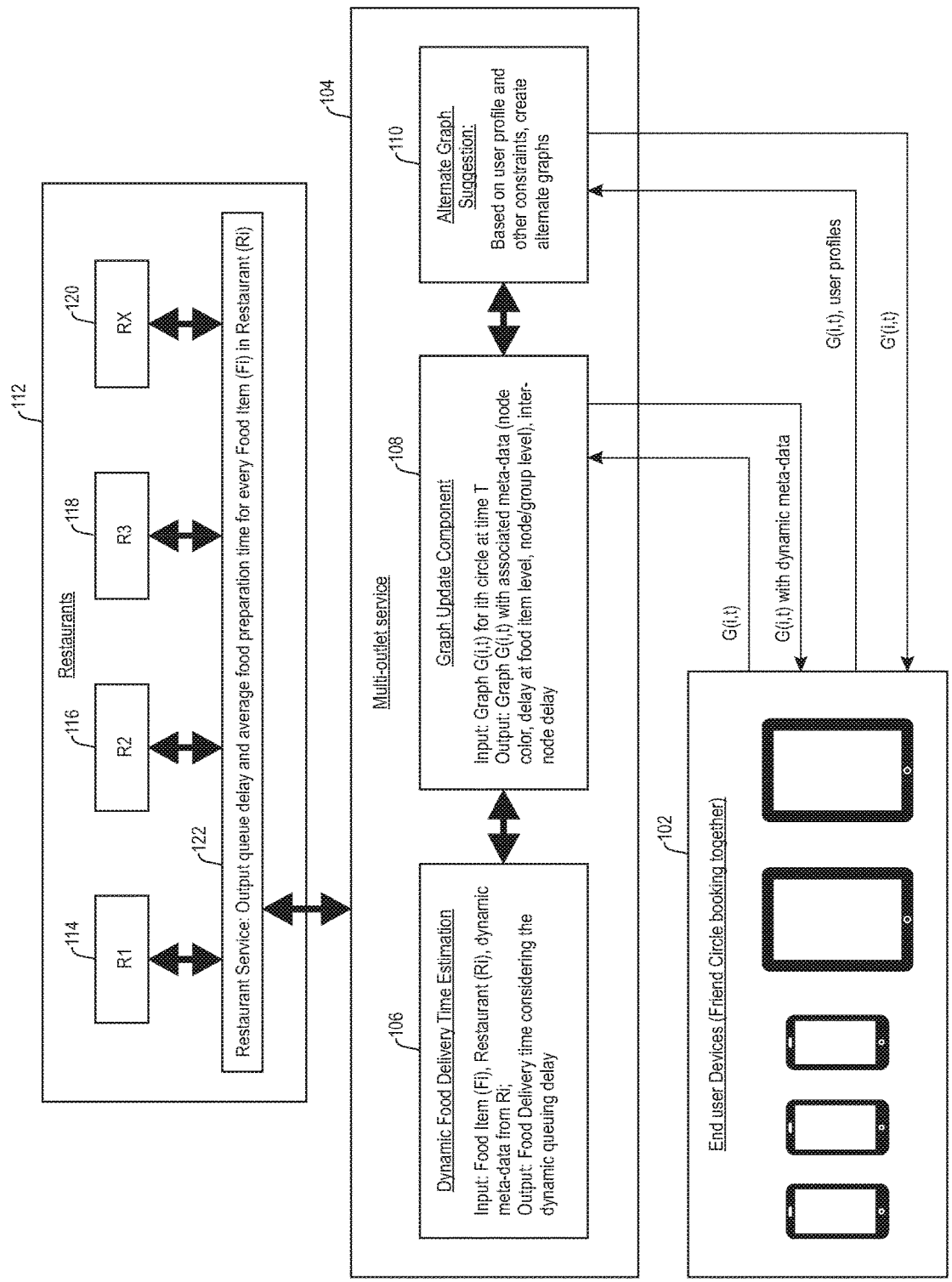
FIG. 1 is a diagram illustrating system architecture, according to an exemplary embodiment of the invention.

As described herein, an embodiment of the present invention includes a collaborative and cognitive multi-outlet food order placement and recommendation system. As used herein, a "food order" can broadly include food, drinks, and/or any edible or consumable items. At least one embodiment of the invention can be implemented via a software application that is executed on a computing device such as a mobile device, a smart phone, a tablet, etc. By way of example, such an embodiment can be implemented in a scenario wherein a group of users attempt to enjoy a meal together, and wherein the users utilize the application on their mobile devices to place orders for multiple items from a selected restaurant.

As used herein, a number of terms can be defined as follows. A "group" refers to a set of food/drink items which the user wishes to have at delivered at approximately the same time. For example, a "starter/appetizer" group, a "main course/entree" group, and a "dessert" group can represent various example groups. In one or more embodiments of the invention, a "user group" can include a collection of individuals (such as friends). Additionally, a "staged delivery" refers to a coordinated delivery of food items ordered in the same group but from different outlets. Further, a "multi-outlet food order" refers to an order of food/drink items of the same group from various outlets. By way merely of example, a multi-outlet food order can include multiple main course items ordered from multiple restaurants.

As further detailed herein, the application can coordinate the orders such that all ordered food items are delivered at approximately the same time. In one or more embodiments of the invention, all ordered food items of the same food group (such as starter/appetizer, main-course/entree, dessert, etc.) can be delivered at approximately the same time. Accordingly, one or more embodiments of the invention can include facilitating dividing orders into multiple groups. Also, for items in a particular group, such an embodiment can include monitoring the order pipeline and adjusting the coordination and/or delivery such that all the items in the same group are delivered at approximately the same time.

Additionally, at least one embodiment of the invention can include facilitating selection, by a user via an interface, of multiple food and/or drink items to be ordered as a group. Also, such a selection can also include a specification of a time-gap between connected groups (such as starter, main course, dessert, etc.). Such a time-gap can refer to the minimum amount of time desired by a user between the deliveries of food/drink in the denoted groups. Further, one or more embodiments of the invention can additionally include recommending one or more changes to the selection/order such that one or more user time constraints are satisfied. Such changes can include, for example, changes to one or more items in a group and/or changes to the inter-group time gap.

At least one embodiment of the invention can also include estimating the minimum waiting time required to deliver all items in a given group at approximately the same time. Such an embodiment can additionally include providing a visual indication of a corresponding impact of any delay in placing the order on the overall delivery time, for example, by color-coding the nodes of each group. Accordingly, based on the visual indication given by the system, if the user does not confirm the order within a given amount of time, the waiting time may increase. One or more embodiments of the invention can also include providing delivery time estimates such that all items in a group are delivered at approximately the same time, as well as considering current delivery schedules of different outlets to provide an impact of delay in placing the order on the overall delivery time. Further, edge weights can be suggested in conjunction with the corresponding impact on delivery time.

By way of example, an edge weight provided by the user can represent an indication of the amount of time that the user desires to spare for a given course of a meal (Group). Also, at least one embodiment of the invention can include providing multiple options for the user. For example, a suggestion may be generated and provided to the user stating that if the user finishes the starter in 20 minutes instead of 30 minutes, then the overall delivery time of the main course and desserts will be reduced by 15 minutes. This may be, for example, because there might be many orders already placed in the system for future time slots, and as such, resources may be occupied at later times.

As noted herein, at least one embodiment of the invention can also include recommending alternate food items and/or groups to users based on past order patterns and group level context. Such recommendations can be generated such that group-level preferences, which can be based on a derived group level context, are satisfied. For example, if in the past, a group of users had ordered meals, at least one embodiment of the invention can include examining the past orders to identify one or more preferred sets of items for the users. Such an embodiment can also include examining the group of users and any relevant commitments (if some of the users have to attend meeting in 30 minutes, for example). Any and/or all such information can then be used to determine recommendations of items in a group node. Additionally, such recommendations can also be based on outlet-specific demand and time constraints.

FIG. 1 is a diagram illustrating system architecture, according to an embodiment of the invention. By way of illustration, FIG. 1 depicts a set of end user devices 102, such as, for example, a collection of friends booking and/or ordering together as a group. Such devices 102 can include personal user devices (such as mobile devices, smart phones, tablets, etc.), and such devices 102 submit food and/or drink orders through an intuitive food-order graph interaction technique embodied in a multi-outlet service 104. The multi-outlet service 104 enables recursive and collaborative multiple group node initialization and stitching, which can be further fine-tuned by cognitive recommendations (considering time constraints and user satisfaction, for example).

As further detailed herein, the multi-outlet service 104 includes a dynamic food delivery estimation component 106, a graph update component 108, and an alternate graph suggestion component 110. The dynamic food delivery estimation component 106 takes as input, derived from a restaurant service component 122, one or more food items ($F_i$), one or more restaurants ($R_i$), and dynamic meta-data from $R_i$, and generates an output that includes a food delivery estimate that incorporates a dynamic queuing delay. By way of illustration, every outlet may have a different demand level which decides its queue length/delay. When these outlets are part of a multi-outlet order, overall order delay changes with time, and this is referred to herein as a dynamic queuing delay. As also depicted in FIG. 1, the restaurant service component 122 interacts with multiple individual restaurant (outlet) components (114, 116, 118, and 120) as part of a larger system 112.

Also, the graph update component 108 receives as input, from the end user devices 102, a graph (G(i,t)) for the $i^{th}$ circle at time t. Based on this input, the graph update component 108 generates, as output, the graph (G(i,t)) with associated meta-data derived from components 106 and 110 (such as node color, delay at a food item level, node/group level, etc.) and inter-node delay values. The generated output of the graph (G(i,t)) with associated meta-data are subsequently provided to the end user devices 102.

Further, the alternate graph suggestion component 110 receives as input, from the end user devices 102, the graph (G(i,t)) and user profiles corresponding to the users of the user devices. User profiles can include, for example, details including user age, user gender, past orders of the user, outlet-specific order patterns attributed to the user, etc. Based on the user profiles and one or more constraints, the alternate graph suggestion component 110 generates one or more alternate graphs (G'(i,t)) and provides such alternate graphs to the end user devices. While constructing a graph, a user can supply a time limit parameter to be associated with the entire meal plan. In one or more embodiments of the invention, the user can additionally specify a separate maximum amount of time for every group node.

Additionally, at least one embodiment of the invention can include creating group nodes (in a graph) and stitching the created group nodes. For example, a user can, via a device interface associated with a software application implemented an embodiment of the invention, drag and/or position a node (to represent a group) and stitch group nodes in accordance with one or more parameters (such as, for example, edge weights). Also, in one or more embodiments of the invention, the user can specify weights (corresponding to the desired time gap between connected groups, for example) on the inter-group edges to create a selection of multiple items to be ordered as part of this group.

By way merely of illustration, consider the following example use case scenario. Assume that a set of people plan to share a meal together in a food court that includes multiple restaurants/outlets. One of the participants can create an event in an application implementing an example embodiment of the invention, and the participant can add other people in the group to the event. Subsequently, one of the added participants can drag and/or position a node, via the application, to represent a food group (starters, main course, etc.). After every group node, a user can specify the amount of time needed to consume the items present in that node, wherein such a specification can represent the weight of the outgoing edge from that node. This user need not be the same user who dragged the node, as any of the users from the group of users can carry out this specification.

One or more embodiments of the invention can also include facilitating collaborative group node initialization. For example, users can collaboratively select multiple items to be ordered as part of each group (node). At least one embodiment of the invention can also include generating an estimated minimum waiting time required in order to deliver all items in the group at (approximately) the same time. Such an embodiment can include considering the time on the incoming edge of the current node.

Further, an embodiment of the invention can include color-coding the node based on a correlation with the pending node states of the other users and a computed maximum time required to obtain all items in the given group. Accordingly, the group node can be color-coded to indicate the serving time, and a visual indication of the impact of any delay in placing the order on the overall delivery time can also be presented.

Also, at least one embodiment of the invention can include implementing a heuristic for computing waiting time for a group. Input for such a heuristic can include a list of all items in a group, a list of the corresponding outlets (restaurants), orders in a queue with the earliest delivery time for an outlet, average preparation time for each item, and one or more item preparation dependencies. As detailed below, based on such inputs, an output can be generated that includes an expected delivery time for all items in a group if the order is placed at time t (at approximately the same time), and the impact of a delay in order placement.

To generate such an output, one or more embodiments of the invention can include bundling the noted items in groups/bundles based on the corresponding outlet. For each outlet and each item (i) in a bundle, such an embodiment includes computing an expected delivery time. By way of example, let $S_i$ represent the set of items in the order queue to be processed before time t and that are related to item i if they use common resources for preparation. By way of example, common resources, as used herein, can refer to cooking resources such as cookware, utensils, ingredients, corresponding chef, etc.

Accordingly, such an embodiment can include computing $T(S_i)$, the sum of preparation times for all items in set $S_i$. Additionally, the earliest delivery (ED) time for item i, $ED(_i)$, $=T(S_i)+$the preparation time for item i. Also, the expected delivery time (EDT) for all items in group G, $EDT(G),=\max($Earliest delivery time of i, for all items i in group G). In one or more embodiments of the invention, the computed EDT(G) is returned to the user(s). Color-coding can additionally be applied with respect to EDT(G). For example, if the delivery time of item (i)=EDT(G), then a first color-code (for example, red) can be applied to the relevant node(s). Also, if the delivery time of item (i)>0.5 EDT(G), then a second color-code (for example, yellow) can be applied to the relevant node(s). Otherwise, for example, a third color-code (for example, green) can be applied to the relevant node(s).

Further, the impact of a delay in order placement by time ti can be calculated as $EDT(G)\_(t+t_1)-EDT(G)\_t$.

Additionally, at least one embodiment of the invention can include generating cognitive recommendations for group node items and inter-node time gaps to improve overall group satisfaction. Such an embodiment can include deriving a group-level context based on past order patterns and current commitments. Also, one or more embodiments of the invention can include recommending one or more alternate substitute group nodes which satisfy at least a portion of group-level preferences, based on the derived group-level context. Such preferences can be derived using the current commitments of the users (scheduled meetings on user calendars, etc.), historical orders placed by the users, etc. Further, an example embodiment of the invention can include generating suggestions (using the group-level context) for new edge weights in conjunction with corresponding impacts on delivery time. For example, such a suggestion indicates that "if starters can be consumed five minutes earlier, then the overall time can be reduced by twenty minutes."

Also, generating cognitive recommendations can additionally include using inputs of user time constraints and user histories of past orders, to output recommendations for items in group node as well as an inter-group time gap. For each group G in an order, let L(G) be the list of items with a delivery time=EDT(G). For each item i in L(G), shortlist a list of similar items based, for example, on price, category, ingredients, review ratings, etc. Based on past orders placed by users, identify substitute items (for each item i) from this shortlist, and select the substitute item with the minimum and/or earliest delivery time.

Such an embodiment can further include recommending a group node with the selected substitute item(s) in lieu of the original group node. Based on the relevant user time constraints and expected waiting time, an order for a particular group node can be placed at some time t. Additionally, one or more embodiments of the invention can include computing and recommending an inter-group time gap so as to meet one or more of the user time constraints.

Figure 2:
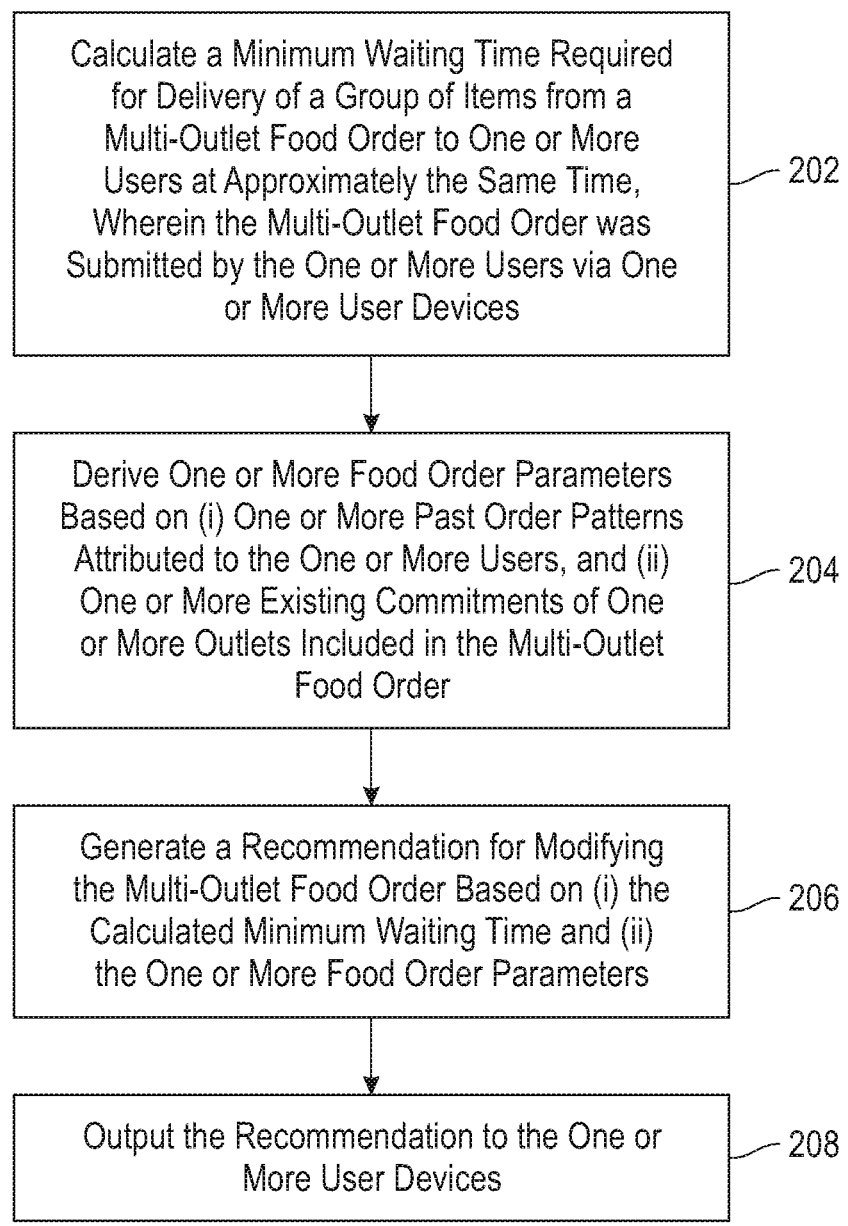
FIG. 2 is a flow diagram illustrating techniques, according to an embodiment of the invention.

FIG. 2 is a flow diagram illustrating techniques according to an embodiment of the present invention. Step 202 includes calculating a minimum waiting time required for delivery of a group of items from a multi-outlet food order to one or more users at approximately the same time, wherein the multi-outlet food order was submitted by the one or more users via one or more user devices (smart phones, tablets, etc.), and wherein the group of items belong to a shared food order category (starters, main courses, desserts, etc.). By way of example, delivery at "approximately the same time" can include delivery at precisely the same time, or can include delivery within a predetermined temporal parameter (such as, for instance, delivery of all items within a window of five minutes). Also, the minimum waiting time can be based on (i) the specific items in the multi-outlet food order, and (ii) information derived from each of the outlets included in the multi-outlet food order.

In one or more embodiments of the invention, the multi-outlet food order includes selected nodes and edges within a graph comprising nodes corresponding to (i) food items, (ii) drink items, and (iii) outlets (such as restaurants, for example). In such an embodiment, calculating the minimum waiting time includes calculating inter-node delay values for the selected edges connecting the selected nodes. Also, each of the selected nodes and edges within the graph can have a specified weight attributed thereto by the one or more users.

Step 204 includes deriving one or more food order parameters based on (i) one or more past order patterns attributed to the one or more users, and (ii) one or more existing commitments of one or more outlets included in the multi-outlet food order.

Step 206 includes generating a recommendation for modifying the multi-outlet food order based on (i) the calculated minimum waiting time and (ii) the one or more food order parameters. The recommendation can include replacement of one or more of the selected nodes and/or one or more of the selected edges with one or more different nodes and/or one or more different edges in the graph.

Step 208 includes outputting the recommendation to the one or more user devices. Additionally, the techniques depicted in FIG. 2 can also include generating one or more new weights to be attributed to one or more of the selected edges, wherein the one or more new weights correspond to impact on delivery time of the order. Further, at least one embodiment of the invention can include providing a visual indication of an impact of any delay caused by any item in the multi-outlet food order on the overall delivery time of the order, wherein the visual indication includes a color-coding of one or more nodes and/or one or more edges of a graph associated with the order.

Also, an additional embodiment of the invention includes presenting, to a group of users via one or more user devices, a graph comprising nodes corresponding to (i) food items, (ii) drink items, and (iii) outlets, and processing a multi-outlet order entered via the one or more user devices, wherein the multi-outlet order comprises selected nodes and edges within the graph. Such an embodiment can also include calculating a minimum waiting time required for delivery of all items in the multi-outlet order to the group of users at approximately the same time, wherein said calculating comprises calculating inter-node delay values for the selected edges connecting the selected nodes. Further, such an embodiment includes deriving one or more order parameters based on (i) one or more past order patterns attributed to the users in the group, and (ii) one or more existing commitments of one or more outlets included in the multi-outlet order. Additionally, such an embodiment can include generating a recommendation for modifying the multi-outlet order based on (i) the calculated minimum waiting time and (ii) the one or more order parameters, and outputting the recommendation to the one or more user devices, wherein the output recommendation comprises replacement of one or more of the selected nodes and one or more of the selected edges with one or more different nodes and one or more different edges in the graph.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives order information sent from a data source (such as an end user device) to the transmission server. The server can process the information, for example, based upon user-provided user preference information that is stored in memory on the server. Subsequently, an alert is generated containing order recommendation information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
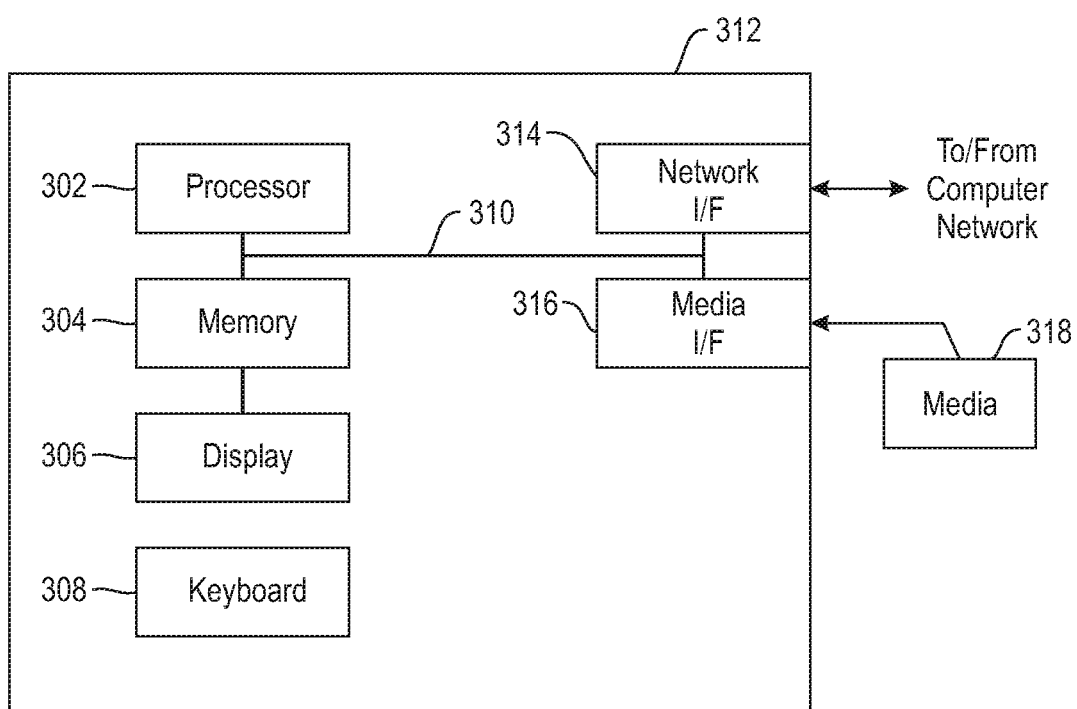
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
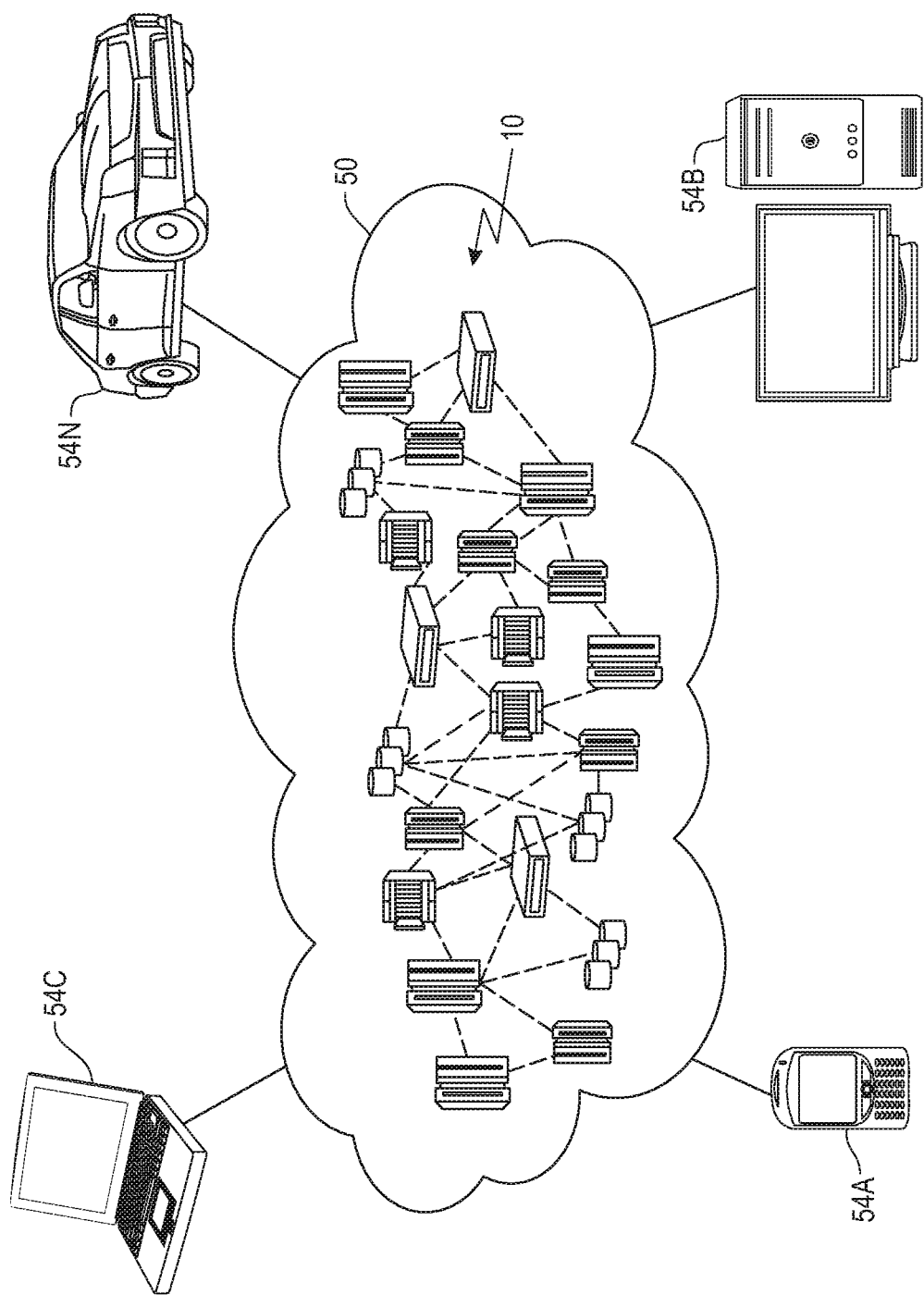
FIG. 4 depicts a cloud computing environment, according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
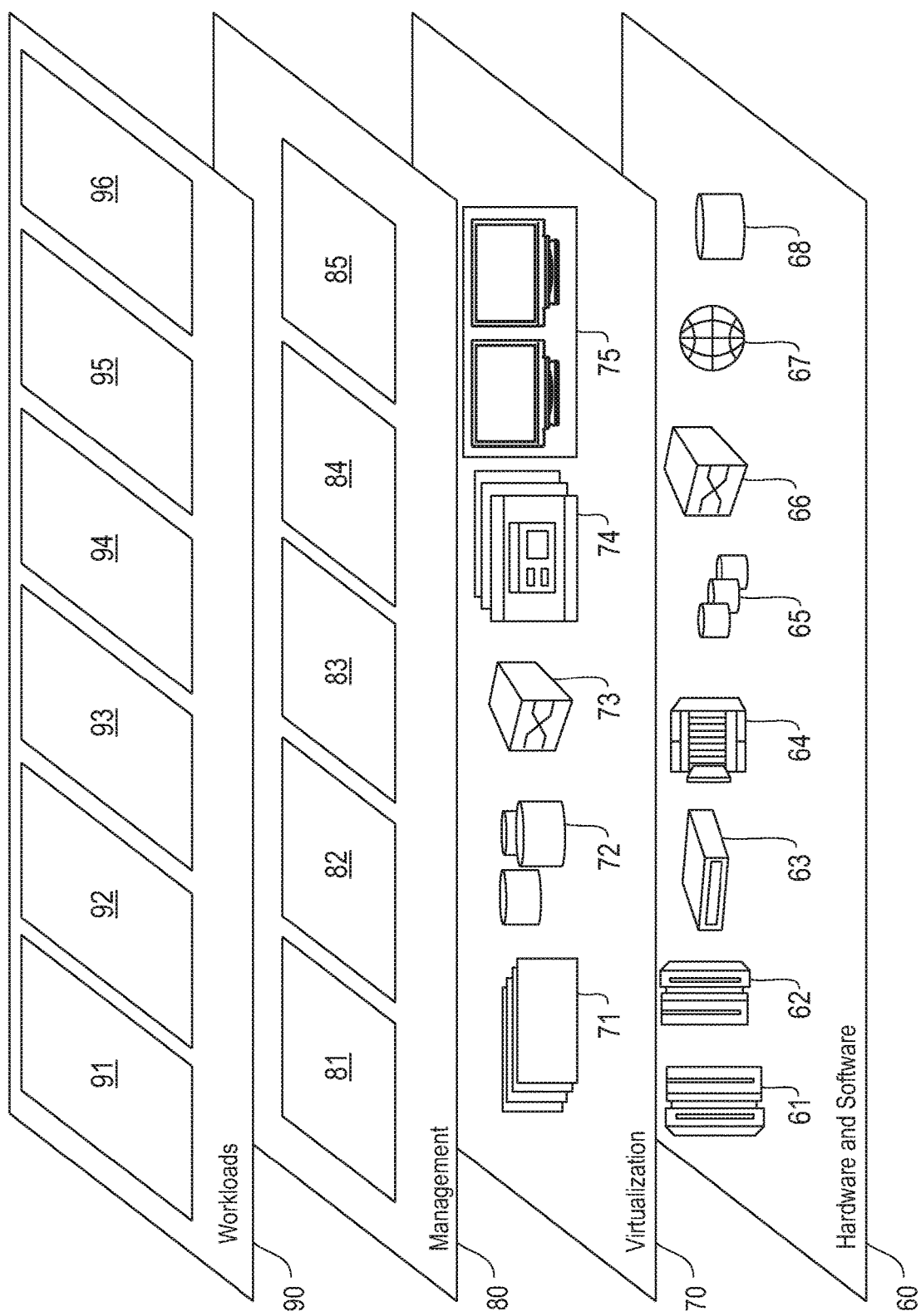
FIG. 5 depicts abstraction model layers, according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-outlet food order placement and recommendation 96, in accordance with one or more embodiments of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, estimating a minimum waiting time required in order to deliver all items in a group at the same time and providing a visual indication of corresponding impact of any delay in placing the order on the overall delivery time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    calculating a minimum waiting time required for delivery of a group of items from a multi-outlet food order to one or more users at approximately the same time, wherein the multi-outlet food order was submitted by the one or more users via one or more interactive user interfaces associated with a software application installed on one or more user devices, wherein the group of items belong to a shared food order category, and wherein said calculating is performed via the software application;

deriving, via the software application, one or more food order parameters based on (i) one or more past order patterns attributed to the one or more users, and (ii) one or more existing commitments of one or more outlets included in the multi-outlet food order;

generating, via the software application, a recommendation for modifying the multi-outlet food order based on (i) the calculated minimum waiting time and (ii) the one or more food order parameters;

outputting the recommendation to the one or more user devices via the one or more interactive user interfaces associated with the software application installed on the one or more user devices;

processing an updated multi-outlet food order submitted, in response to the recommendation, by the one or more users via the one or more interactive user interfaces associated with the software application installed on the one or more user devices; and performing one or more automated actions pertaining to coordinate physical delivery of the updated multi-outlet food order to the one or more users.

2. The computer-implemented method of claim 1, wherein the one or more user devices comprise one or more smart phones.

3. The computer-implemented method of claim 1, wherein the one or more user devices comprise one or more tablets.

4. The computer-implemented method of claim 1, wherein the minimum waiting time is based on (i) specific items in the multi-outlet food order, and (ii) information derived from each of the outlets included in the multi-outlet food order.

5. The computer-implemented method of claim 1, wherein the multi-outlet food order comprises selected nodes and edges within a graph comprising nodes corresponding to (i) food items, (ii) drink items, and (iii) outlets.

6. The computer-implemented method of claim 5, wherein said calculating the minimum waiting time comprises calculating inter-node delay values for the selected edges connecting the selected nodes.

7. The computer-implemented method of claim 5, wherein the recommendation comprises replacement of one or more of the selected nodes and/or one or more of the selected edges with one or more different nodes and/or one or more different edges in the graph.

8. The computer-implemented method of claim 5, wherein each of the selected nodes and edges within the graph has a specified weight attributed thereto by the one or more users.

9. The computer-implemented method of claim 8, comprising:

generating one or more new weights to be attributed to one or more of the selected edges, wherein the one or more new weights correspond to impact on delivery time of the order.

10. The computer-implemented method of claim 1, comprising:

providing a visual indication of an impact of any delay caused by any item in the multi-outlet food order on overall delivery time of the order.

11. The computer-implemented method of claim 10, wherein the visual indication comprises a color-coding of one or more nodes and/or one or more edges of a graph associated with the order.

12. The computer-implemented method of claim 1, where the multiple outlets included in the multi-outlet food order comprise multiple restaurants.

13. A computer program product comprising a computer readable storage medium having program instructions embodied therewith, the program instructions executable by a device to cause the device to:

calculate a minimum waiting time required for delivery of a group of items from a multi-outlet food order to one or more users at approximately the same time, wherein the multi-outlet food order was submitted by the one or more users via one or more interactive user interfaces associated with the program, wherein the group of items belong to a shared food order category;

derive one or more food order parameters based on (i) one or more past order patterns attributed to the one or more users, and (ii) one or more existing commitments of one or more outlets included in the multi-outlet food order;

generate a recommendation for modifying the multi-outlet food order based on (i) the calculated minimum waiting time and (ii) the one or more food order parameters;

output the recommendation to the one or more user devices via the one or more interactive user interfaces associated with the program process an updated multi-outlet food order submitted, in response to the recommendation, by the one or more users via the one or more interactive user interfaces associated with the software application installed on the one or more user devices; and perform one or more automated actions pertaining to coordinate physical delivery of the updated multi-outlet food order to the one or more users.

14. The computer program product of claim 13, wherein the multi-outlet food order comprises selected nodes and edges within a graph comprising nodes corresponding to (i) food items, (ii) drink items, and (iii) outlets.

15. The computer program product of claim 14, wherein each of the selected nodes and edges within the graph has a specified weight attributed thereto by the one or more users.

16. The computer program product of claim 15, wherein the program instructions executable by a computing device further cause the computing device to:

generate one or more new weights to be attributed to one or more of the selected edges, wherein the one or more new weights correspond to impact on delivery time of the order.

17. The computer program product of claim 13, wherein the program instructions executable by a computing device further cause the computing device to:

provide a visual indication of an impact of any delay caused by any item in the multi-outlet food order on overall delivery time of the order.

18. The computer program product of claim 17, wherein the visual indication comprises a color-coding of one or more nodes and/or one or more edges of a graph associated with the order.

19. A system comprising:
a memory; and
at least one processor coupled to the memory and configured for:
calculating a minimum waiting time required for delivery of a group of items from a multi-outlet food order to one or more users at approximately the same time, wherein the multi-outlet food order was submitted by the one or more users via one or more interactive user interfaces associated with the program, wherein the group of items belong to a shared food order category;

deriving one or more food order parameters based on (i) one or more past order patterns attributed to the one or more users, and (ii) one or more existing commitments of one or more outlets included in the multi-outlet food order;

generating a recommendation for modifying the multi-outlet food order based on (i) the calculated minimum waiting time and (ii) the one or more food order parameters;

outputting the recommendation to the one or more user devices via the one or more interactive user interfaces associated with the program processing an updated multi-outlet food order submitted, in response to the recommendation, by the one or more users via the one or more interactive user interfaces associated with the software application installed on the one or more user devices; and performing one or more automated actions pertaining to coordinate physical delivery of the updated multi-outlet food order to the one or more users.

20. A computer-implemented method, comprising:

presenting, to a group of users via one or more interactive user interfaces associated with a software application installed on one or more user devices, a graph comprising nodes corresponding to (i) food items, (ii) drink items, and (iii) outlets;

processing, via the software application, a multi-outlet order entered via the one or more user devices, wherein the multi-outlet order comprises selected nodes and edges within the graph;

calculating, via the software application, a minimum waiting time required for delivery of all items in the multi-outlet order to the group of users at approximately the same time, wherein said calculating comprises calculating inter-node delay values for the selected edges connecting the selected nodes;

deriving, via the software application one or more order parameters based on (i) one or more past order patterns attributed to the users in the group, and (ii) one or more existing commitments of one or more outlets included in the multi-outlet order;

generating, via the software application, a recommendation for modifying the multi-outlet order based on (i) the calculated minimum waiting time and (ii) the one or more order parameters;

outputting the recommendation to the one or more user devices via the one or more interactive user interfaces associated with the software application installed on the one or more user devices, wherein the output recommendation comprises replacement of one or more of the selected nodes and one or more of the selected edges with one or more different nodes and one or more different edges in the graph;

processing an updated multi-outlet food order submitted, in response to the recommendation, by the one or more users via the one or more interactive user interfaces associated with the software application installed on the one or more user devices; and performing one or more automated actions pertaining to coordinate physical delivery of the updated multi-outlet food order to the one or more users.

\* \* \* \* \*